(12) United States Patent
Aguiluz-Aceves

(10) Patent No.: US 10,010,052 B2
(45) Date of Patent: Jul. 3, 2018

(54) ONE PIECE ELEGANT VEST WITH SIDE JOINTS FOR PETS (ANIMALS) VELCRO JOINT AND FASTENING SYSTEM

(71) Applicant: Antonio Juan Ignacio Aguiluz Aceves, Distrito Federal (MX)

(72) Inventor: Antonio Juan Ignacio Aguiluz-Aceves, Mexico City (MX)

(*) Notice: Subject to any disclaimer, the term of this patent is extended or adjusted under 35 U.S.C. 154(b) by 0 days.

(21) Appl. No.: 14/910,241

(22) PCT Filed: Nov. 27, 2014

(86) PCT No.: PCT/MX2014/000188
§ 371 (c)(1),
(2) Date: Feb. 4, 2016

(87) PCT Pub. No.: WO2015/050427
PCT Pub. Date: Apr. 9, 2015

(65) Prior Publication Data
US 2016/0174524 A1    Jun. 23, 2016

(30) Foreign Application Priority Data

Oct. 2, 2013 (MX) .................. MX/u/2013/000492

(51) Int. Cl.
*A01K 13/00* (2006.01)
(52) U.S. Cl.
CPC .................. *A01K 13/006* (2013.01)
(58) Field of Classification Search
CPC .................................................. A01K 13/006
See application file for complete search history.

(56) References Cited

U.S. PATENT DOCUMENTS

| | | | | |
|---|---|---|---|---|
| 3,742,679 A | * | 7/1973 | Jordan | A01K 13/006 119/850 |
| 4,472,839 A | * | 9/1984 | Johansen | A41F 9/002 128/DIG. 15 |
| 5,060,458 A | * | 10/1991 | Curtis | A01K 13/006 54/79.2 |
| 2002/0121247 A1 | * | 9/2002 | Sharpe | A01K 13/006 119/820 |
| 2003/0073938 A1 | * | 4/2003 | Crawford | A61F 5/0113 601/32 |
| 2003/0177984 A1 | * | 9/2003 | Newman | A01K 13/006 119/850 |
| 2007/0056530 A1 | * | 3/2007 | Nassour | A01K 13/006 119/850 |
| 2007/0204808 A1 | * | 9/2007 | Harada | A01K 13/006 119/850 |

(Continued)

OTHER PUBLICATIONS

William Tuxedo Vest. Available at http://www.tailsinthecity.com/William_Tuxedo_Vest_p/rrc-wtv.htm. Accessed by Examiner: Aug. 11, 2016. Available Oct. 9, 2011.*

*Primary Examiner* — Kristen Matter

(57) ABSTRACT

A one piece elegant vest design with side closures for pets has a white breast band simulating a shirt, a bow tie and a double sided hook and loop fastening system for closing the vest about a pet. The fastening system includes large hook and loop fastening system strips on a lower portion of the vest that match with a series of short hook and loop fastening system strips on an upper portion of the vest facilitate putting the vest on and off of a pet very rapidly and securely.

6 Claims, 2 Drawing Sheets

(56) References Cited

U.S. PATENT DOCUMENTS

| | | | | |
|---|---|---|---|---|
| 2009/0292343 A1* | 11/2009 | Sternlight | ............ | A01K 13/006 607/112 |
| 2009/0308330 A1* | 12/2009 | Kajanoff | .............. | A01K 27/002 119/850 |
| 2012/0174876 A1* | 7/2012 | Johnson | .................... | F41H 1/02 119/850 |
| 2013/0333628 A1* | 12/2013 | Wickens | ................ | A01K 15/02 119/702 |
| 2014/0230754 A1* | 8/2014 | McGraw | ............. | A01K 13/006 119/855 |
| 2015/0059070 A1* | 3/2015 | Boston, Jr. | ......... | A41D 13/1245 2/463 |
| 2015/0114312 A1* | 4/2015 | Cacopardo | ........... | A01K 13/006 119/850 |

\* cited by examiner

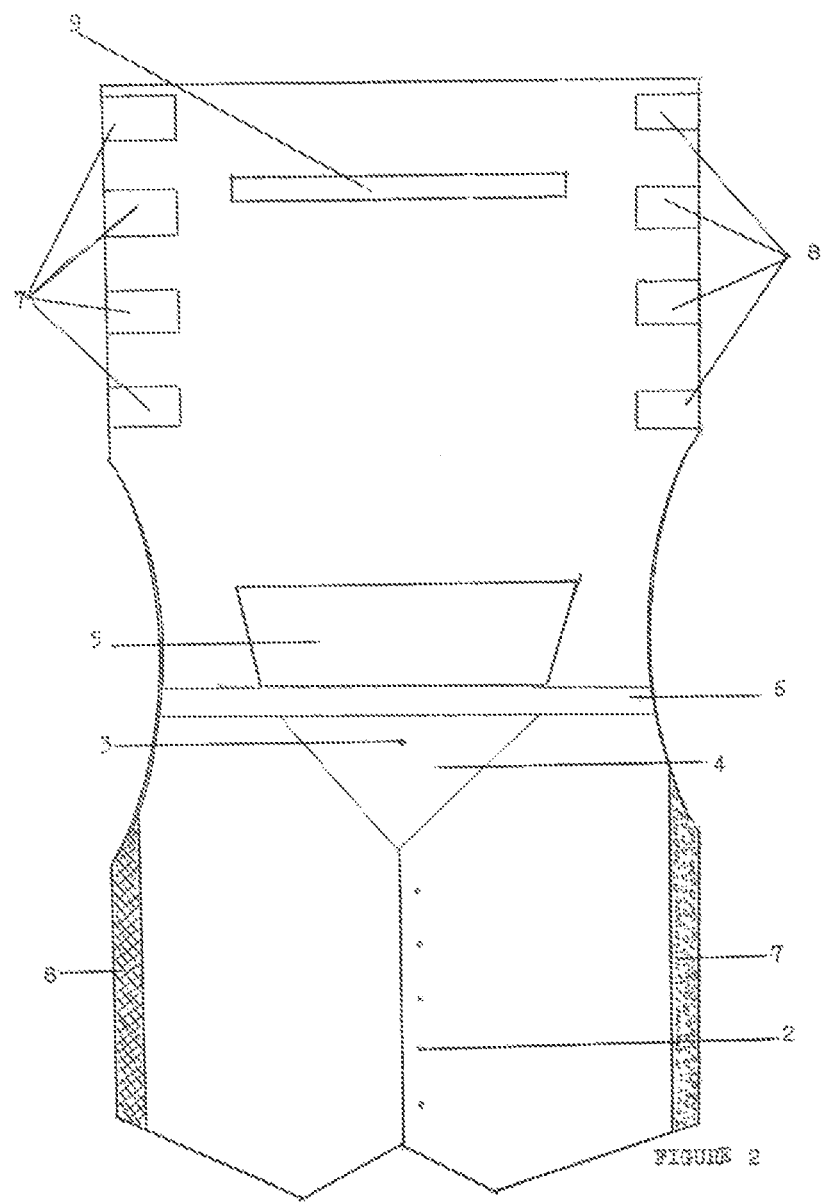

ONE PIECE ELEGANT VEST WITH SIDE JOINTS FOR PETS (ANIMALS) VELCRO JOINT AND FASTENING SYSTEM

BACKGROUND OF THE INVENTION

Regular pet cloths fastened with a hook and loop fastening system result have the problem of a lack of a reliable fastening system and the need to carry out regular and frequent corrections or adjustments of the clothing since it otherwise gets loose or constricts the pet too much.

BRIEF SUMMARY OF THE INVENTION

This invention focuses on a combination of a double side hook and loop fastening system of male and female pieces to produce a rapid and secure fastening. In addition, a one piece vest facilities fast set-up since it can be placed over the pet's head and the final adjustment done at both sides of the vest. It specifically consists of a one piece stylish vest with side joints and a white breast band simulating a shirt and bow tie. The hook and loop fastening system allows the vest to be secured in place and unfastened quickly and surely in seconds.

BRIEF DESCRIPTION OF DRAWINGS

FIG. 2 shows a back view of the interior of the vest.

DETAILED DESCRIPTION OF THE INVENTION

Figure 1:
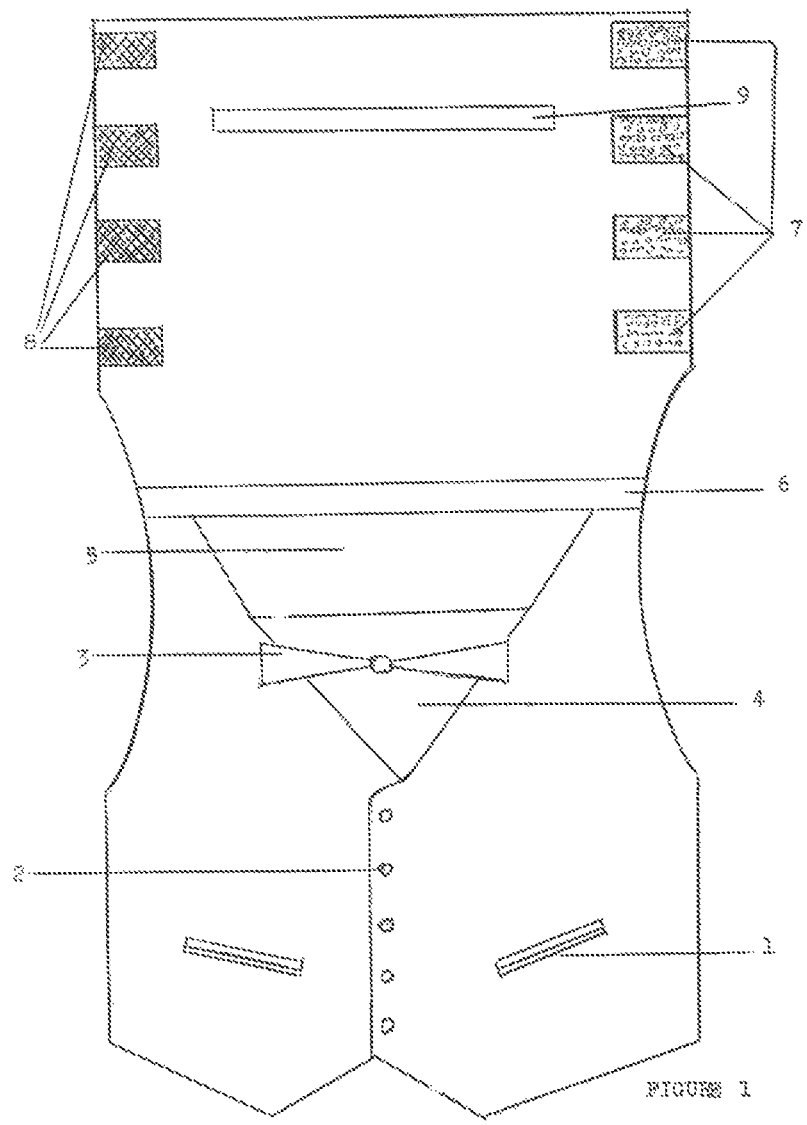
FIG. 1 shows a front view of the exterior of the vest.

FIG. 1 shows the one piece elegant vest having an upper portion (towards the top of the figure) and a lower portion (towards the bottom of the figure) in a front view. The lower portion of the exterior of the vest includes buttons (2), side pockets/slits (1), a white breast band simulating a shirt (4), and a bow tie (3), drawn to depict the present invention. The upper portion of the vest includes a self adjusting elastic band (9) and a plurality of spaced, short strips of hook and loop fasteners (7) and (8) along each of the left and right edges in different positions for rapid and secure fastening. Male hook and loop fastening system adjustments (7) are located on the right side and the female hook and loop fastening system adjustments (8) are located on the left side, with a self-adjusting elastic band (9) centered between the edges of the upper portion towards the uppermost edge of the vest. A central opening (5) is provided for introducing the head of the pet. A vest reinforcement (6) at the edge of the opening (5) to fit the pet's head can also be seen. The upper and lower portions of vest are sewn together so that they connected by the neck in a way that can be easily slipped over the pet's head.

The lower portion interior of the vest seen in FIG. 2 includes long female hook and loop fastening system strips (8) on the left side and long male hook and loop fastening system strips (7) on the right side along the edge of the vest. For the purpose of better understanding male hook and loop fastening system strips are inserted in female hook and loop fastening system strips. The female hook and loop fastening system strips are the pieces where the male hook and loop fastening system strips are inserted.

This elegant vest for pets is manufactured of materials such as cashmere with acetate, polyester or the like.

To place the elegant vest on the pet first pass the pet's head through the access opening (5) provided for this purpose. To fasten the vest, side adjustment is made using the hook and loop fastening system closures provided for this purpose. The long strips of the hook and loop fastening system (7) and (8) on the lower portion are matched to the respective short strips of the hook and loop fastening system (7) and (8) on the upper portion to make the adjustment easy, rapid and secure.

The vest dimensions can vary proportionally with the size of pets. Within the field of pets clothing, I present an elegant vest design, one of the most advanced and efficient solutions for pet's clothing that consists of using a series of the hook and loop fastening system pieces placed as disclosed, to facilitate putting the vest on and off very rapidly and safely while allowing the pet to feel comfortable and assured that the vest the pet wears is not going to go loose.

The fastening system as proposed by this invention has been designed to solve the problem of putting on the vest to achieve full satisfaction, for it focuses on a quick double side male and female fastening system for rapid and secure hold.

What is claimed is:

1. A protective vest for a pet comprising:
   a one piece vest having an upper portion and a lower portion;
   an opening between the upper and lower portions of the vest for introducing the head of the pet; and
   a hook and loop fastening system consisting of:
     four spaced short strips of hook and loop material on an exterior surface of the upper portion on both the left and right sides; and
     a long strip of hook and loop material on an interior surface of the lower portion on both the left and right sides;
   wherein each short strip of hook and loop material has a length that is less than a length of each long strip of hook and loop material; and
   wherein the short strips of hook and loop material on the left side of the upper portion mate with the long strip of hook and loop material on the left side of the lower portion and the short strips of hook and loop material on the right side of the upper portion mate with the long strip of hook and loop material on the right side of the lower portion in order to secure the vest about the pet's torso.

2. The protective vest of claim 1 further comprising slits on the lower portion exterior surface of the vest that form pockets for holding items.

3. The protective vest of claim 1 further comprising buttons on the lower portion exterior surface of the vest.

4. The protective vest of claim 1 further comprising a white breast band on the lower portion exterior surface of the vest simulating a shirt and providing protection for the pet against weather and insects.

5. The protective vest of claim 1 further comprising a bow tie on the lower portion exterior surface of the vest.

6. The protective vest of claim 1 further comp sing a self-adjusting elastic band on the upper portion exterior surface of the vest.

* * * * *